April 5, 1927.
G. E. SANDBECK
SLICING BOARD
Filed March 12, 1926  2 Sheets-Sheet 1
1,623,498
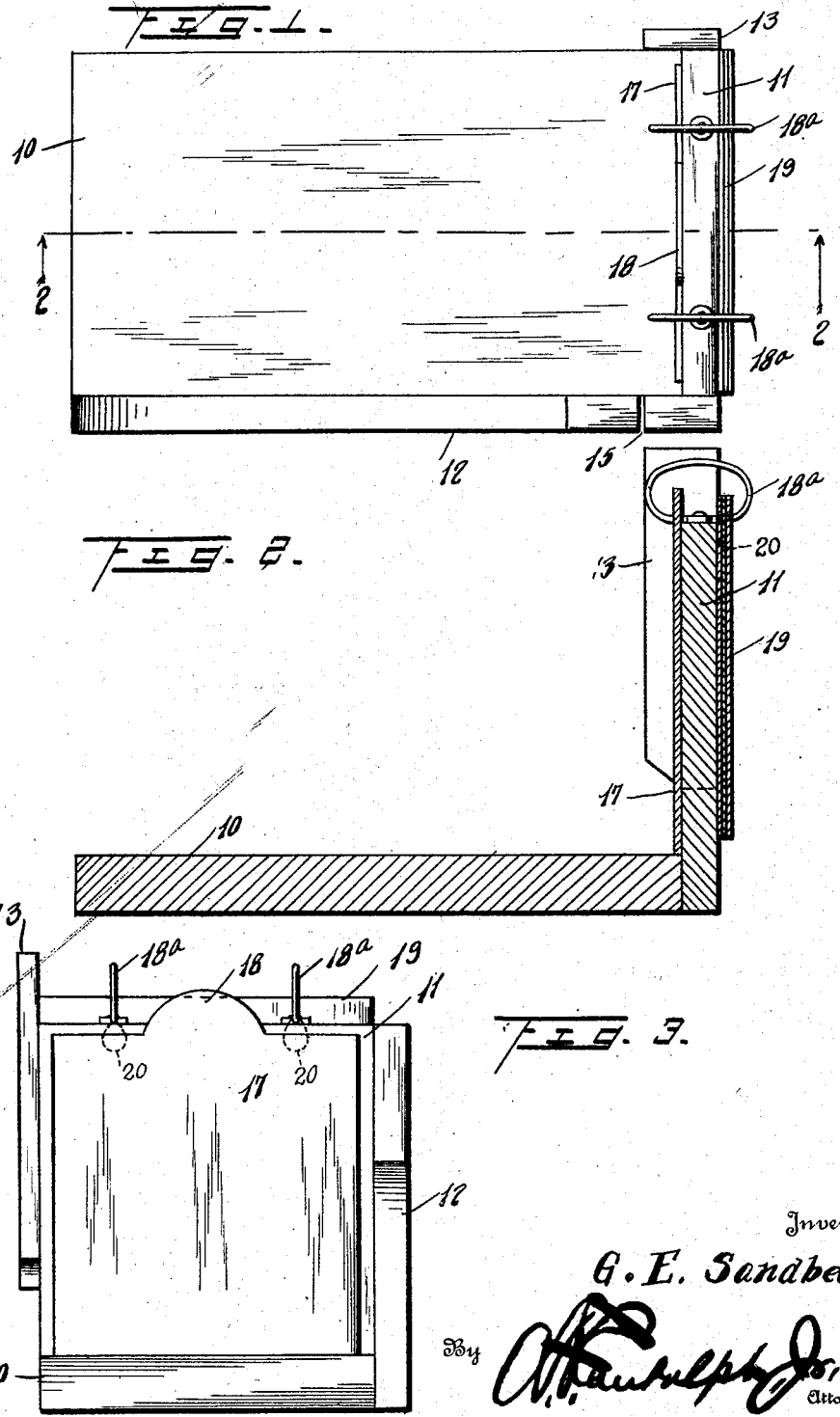

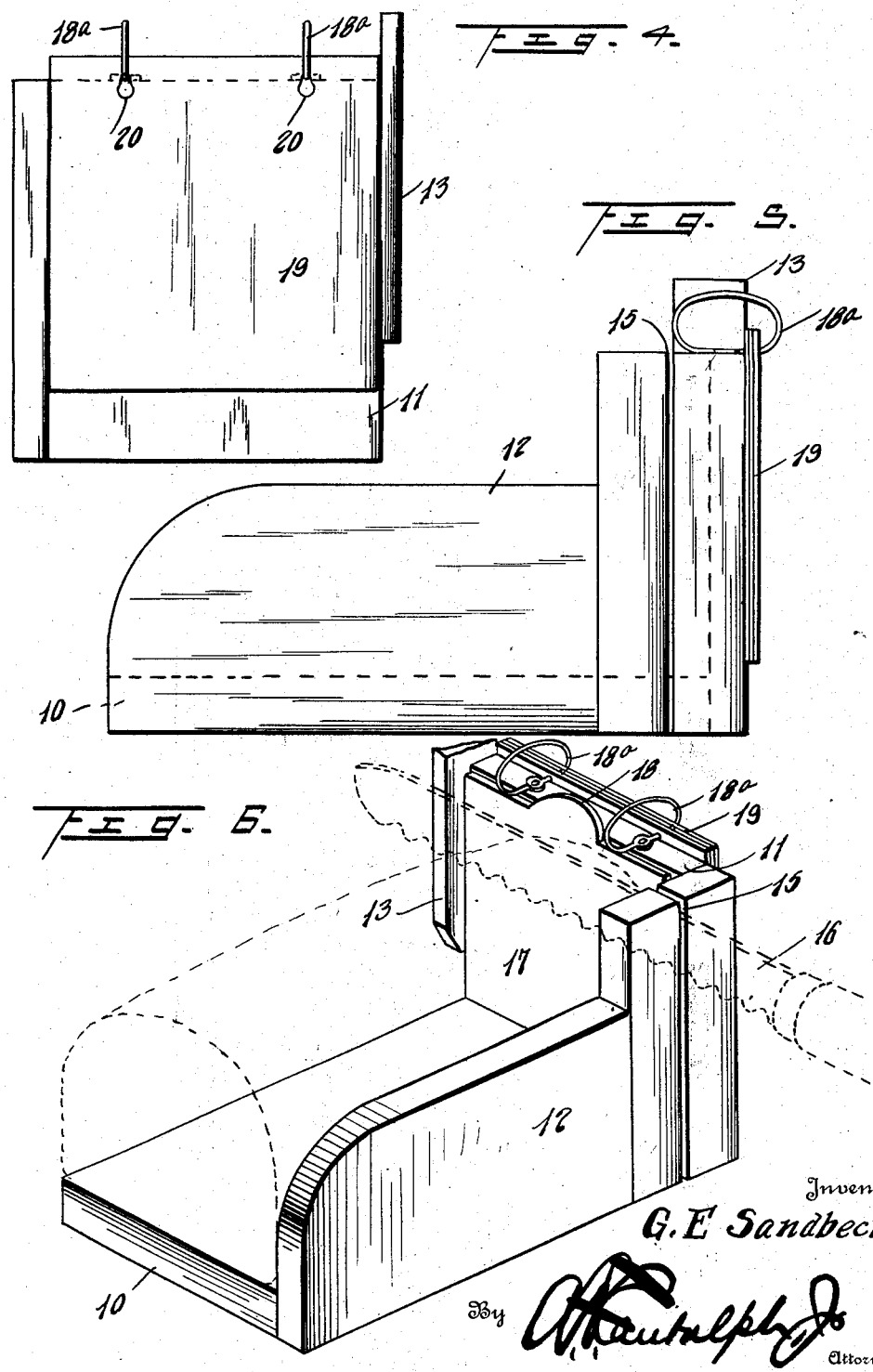

Patented Apr. 5, 1927.

1,623,498

UNITED STATES PATENT OFFICE.

GUSTAF E. SANDBECK, OF NEW YORK, N. Y.

SLICING BOARD.

Application filed March 12, 1926. Serial No. 94,294.

This invention relates to a board or a device designed for use in slicing bread, other food products or materials.

It is aimed to provide a novel construction wherein particularly soft materials, like fresh bread, may be expeditiously cut into slices of uniform thickness.

Another object is to provide a novel means for regulating the width of the slices to be cut.

Still another object is to provide a novel construction of means whereby the cut slices may be readily dislodged for removal.

An operative embodiment is shown in accompanying drawings and additional objects and advantages will be pointed out or become apparent from the following description thereof.

In said drawings:—

Figure 1 is a view of the invention in plan;

Figure 2 is a longitudinal vertical sectional view taken on the line 2—2 of Figure 1;

Figure 3 is an end elevation;

Figure 4 is an elevation of the opposite end;

Figure 5 is a side elevation of the device in the position it assumes in front of the operator; and Figure 6 is a perspective view of the device illustrating the knife and a loaf of bread in connection therewith as in operation.

Referring specifically to the drawings, the device comprises a base 10, a front end wall 11, a front side wall 12 and a knife gage strip 13, such parts usually being of wood although capable of manufacture from any material desired and secured together in any desired manner.

The loaf of bread or other material to be cut rests on the base 10 and by the hand of the operator is forced toward the front end wall 11 and pulled against the front side wall 12. Such wall 12 has a vertical opening or slit 15 in which an ordinary bread knife or the like 16 may be moved and which knife engages the adjacent vertical edge of the gage strip 13 so that the knife will work in parallelism vertically to the front end wall 11 in cutting the bread or other material into slices.

Against the wall 11, a relatively thin pallet or plate 17 may be placed, which will be held in position by the bread loaf, and which pallet after a slice is severed from the loaf, may be moved in a direction away from the end wall 11, to thus move the slice of bread away from the same so that it may be readily removed. To facilitate manipulation of the plate 17, it has an upstanding tab or fingerpiece 18.

Suitable means is provided whereby the thickness of the bread slices to be cut may be predetermined. In this connection, hinged loops 18$^a$, upstanding and longitudinally disposed are suitably fastened at the top of the front wall 11 and pivotally mounted on the loops 18$^a$ are a suitable number of thickness gage plates 19, the loops being accommodated in enlarged openings 20 of said plates. Said plates 19 when not in use may occupy a position at the outside of the wall 11, suspended from the loops 18. When the thickness of the slice to be cut is to be gaged, one or more of said plates may be swung upwardly, across the front wall 11 and then downwardly, on the loops 18$^a$, occupying a position in front of the plate 11, and thus decreasing the distance between the slit 15 and the wall 11, correspondingly limiting the thickness of the slice which may be cut. In this connection, the plate 17 is removed before the plate or plates 19 are swung into operative position and it is replaced in front of the plate or plates 19 over the base 10, prior to slicing.

It will be realized that in use, the device may to very good advantage be used in connection with hot or soft bread since it will insure cutting of the slices of uniform thickness, as contrasted with the uneven slices cut by a knife, especially when the bread is hot or fresh.

Various changes may be resorted to provided they fall within the spirit and scope of the invention.

I claim as my invention:—

1. A slicing appliance of the class described having a wall for abutment by the material to be cut, means to guide a knife in slicing the material, means operable relatively to said wall to control the thickness of the slice to be cut, said means constituting a plate, and means on the wall hinging the plate whereby it may be moved from against one side of the wall to the other side of the wall.

2. A slicing appliance of the class described having a wall constituting an abutment for the material to be sliced, means to guide a knife in slicing the material, and a plate disposed against said wall held against accidental displacement by the material, said plate being movable away from the wall to facilitate removal of a slice.

3. A slicing appliance of the class described comprising a wall against which the material to be sliced abuts, means to guide a knife relatively to said wall in slicing the material, hinge loops disposed adjacent the top of said wall and transversely thereof, and gage plates pivotally and bodily movably mounted on said loops whereby they may selectively occupy positions on either side of said wall.

In testimony whereof I affix my signature.

GUSTAF E. SANDBECK.